H. R. HUGHES.
REAMER.
APPLICATION FILED FEB. 24, 1914.

1,136,135.

Patented Apr. 20, 1915.

Witnesses:
Geo. R. Cadson
C. M. Badger

Inventor,
Howard R. Hughes.
By Bakewell & Cornwall attys.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

REAMER.

1,136,135.  Specification of Letters Patent.  Patented Apr. 20, 1915.

Application filed February 24, 1914. Serial No. 820,671.

*To all whom it may concern:*

Be it known that I, HOWARD R. HUGHES, a citizen of the United States, residing at Houston, Texas, have invented a certain new and useful Improvement in Reamers, of which the following is a full, clear, and exact description, such as will enable others skilled in the art to which it appertains to make and use the same.

This invention relates to reamers such as are used in the operation of drilling a well for reaming out or increasing the diameter of a hole that has become crooked or smaller than the required diameter, due to canting of the drill or dulling of the cutters on the drill.

One object of my invention is to provide an efficient reamer that comprises a plurality of rotatable cutters which act on the side wall of the hole and increase the diameter of same progressively as the reamer descends into the hole.

Another object is to provide a serviceable reamer that comprises only a few rugged parts which are strong and rigid enough to successfully withstand the strains to which they are subjected when the reamer is being used in a hard, rocky formation. And still another object is to provide a reamer that is a separate and distinct tool from the drill or bit used in the operation of drilling a well and which is equipped with horizontally-disposed cutters that act only on the side of the hole.

Other objects and desirable features of my invention will be hereinafter pointed out.

Figure 1:
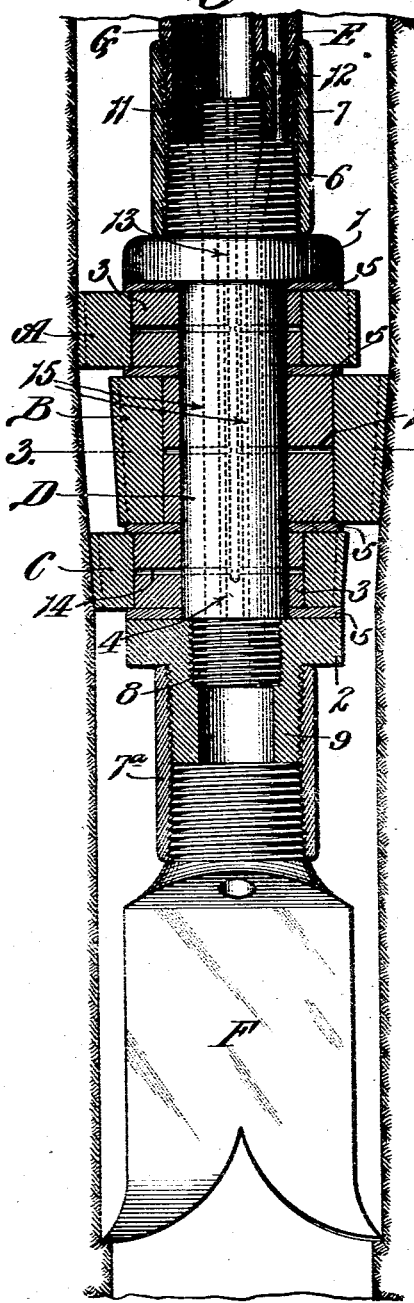
Figure 2:
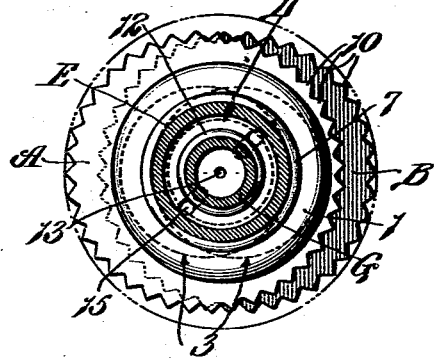
Figure 3:
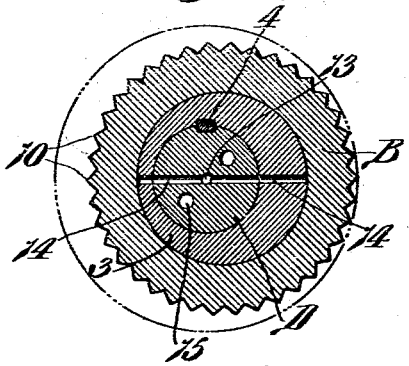

Figure 1 of the drawings is a vertical sectional view of a reamer constructed in accordance with my invention; Fig. 2 is a top plan view of same; and Fig. 3 is a horizontal sectional view taken on the line 3—3 of Fig. 1.

Briefly described, my improved reamer consists of a plurality of horizontally-disposed rotatable cutters arranged one above the other in different horizontal planes and a supporting means for said cutters that is adapted to be connected to an ordinary drill stem.

Referring to the drawings which illustrate the preferred form of my invention, A, B and C designate three rotatable cutters that are arranged one above the other on a supporting means that preferably consists of a vertically-disposed spindle D which is provided adjacent its upper and lower ends with caps or end-pieces 1 and 2, respectively, that confine the cutters in operative positions on the spindle. The diameter of said cutters is much less than the diameter of the hole that is to be reamed, and they are mounted on the spindle D in such a manner that the cutter B will bear against the side of the hole at a point diametrically opposite the points where the cutters A and C bear against the side of the hole so as to hold the spindle D at the center of the hole and prevent it from wabbling. In other words, the cutters A, B and C are mounted on the spindle or supporting device D in such a manner that the intermediate cutter B overcomes the side thrust caused by the cutters A and C acting on the side of the hole and thus holds the spindle D straight. While I have herein stated that the cutter B engages the side of the hole at a point diametrically opposite to the points where the cutters A and C act on the side of the hole, I do not wish it to be understood that my invention is limited to a reamer in which the cutters are arranged in this exact manner so long as they are so disposed that they engage the side of the hole at different points or in such a way that there is little tendency for the supporting spindle to wabble. Furthermore, while I have illustrated the preferred embodiment of my invention as comprising three cutters, this is not essential for the number of the cutters could be varied without departing from the spirit of my invention.

The staggered arrangement of the cutters is effected in the embodiment of my invention herein shown by means of eccentric bushings 3 that are connected to the spindle D in such a way that they cannot turn or rotate with relation to said spindle, one of said eccentric bushings being provided for each of the cutters, as shown in Fig. 1. One convenient way of connecting the bushings 3 to the spindle D is illustrated in Fig. 3 wherein the reference character 4 designates a key that fits in a vertically-disposed groove in the spindle D, and which projects into notches in the bushings 3, thereby securely keying said bushings to the spindle D. Washers 5 are preferably interposed between the cutters and also between the cutters and the end-pieces 1 and 2 of the spindle. The cap or head-piece 1 at the upper end of the spindle D is preferably formed integral with the spindle, and is provided with a screw-threaded portion 6 that enables the reamer to be connected to the drill stem E by means of an internally-threaded collar 7 such as is generally used for connecting a drill bit to a drill stem. The bottom end-piece 2 of the spindle is preferably detachably connected to the spindle so as to enable the bushings 3 and the cutters to be applied to or removed from the spindle easily, one convenient way of connecting the end-piece 2 to the spindle being herein illustrated wherein said end-piece is screwed onto a threaded portion 8 at the lower end of the spindle D.

In practice, a drill of any preferred type is usually mounted on the lower end of the reamer. I have therefore provided the bottom end-piece 2 with a screw-threaded portion 9 of the same external diameter as the screw-threaded portion 6 at the upper end of the reamer so as to enable an ordinary drill F, either a fish-tail bit or a roller bit, to be connected to the lower end of the reamer by means of a coupling sleeve 7a that is screwed onto the portion 9 of the bottom end-piece of the spindle. The cutters may be provided with any suitable kind of cutting surface, the cutters herein shown having straight, vertically-disposed teeth 10, and while I prefer to make the intermediate cutter B approximately twice the thickness or height of the cutters A and C, this, of course, is not essential to the successful operation of my reamer so long as the cutters are so proportioned that the combined area of the cutting edges on opposite sides of the hole will be equal or approximately so, thus insuring uniform wear which will result in keeping the cutting edges of the cutters at the same relative distance from the center of the reamer. The bottom cutter C and the intermediate cutter B are preferably beveled slightly, as shown in Fig. 1, so as to cause the diameter of the hole to be increased gradually or progressively as the reamer descends into the hole, but the top cutter A is the same diameter throughout its entire height so that the cutting face of same will be straight.

A lubricant-holder is preferably mounted on or carried by the spindle D, and ducts are formed in the spindle so as to supply the lubricant to the bearing surfaces on which the cutters revolve. In the form of my invention herein shown, a lubricant-holder G that is arranged inside of the drill stem 8, is connected to a screw-threaded portion 11 on the upper end of the spindle by means of a coupling sleeve 12, and a duct 13 leads downwardly from said lubricant-holder to cross ducts 14 in the spindle and in the bushings 3 so as to supply the lubricant to the bearings of the cutters.

The reference character 15 designates water-holes that extend longitudinally through the spindle D so as to provide passageways for the flushing water that is pumped down through the hollow drill stem E in the usual manner so as to flush out the hole and prevent the disintegrated material from packing in the hole.

A reamer of the construction above-described will quickly straighten a crooked hole or increase the diameter of a hole that "has come in"; or, in other words, become smaller than the required diameter, owing to the fact that it comprises rotatable cutters whose entire cutting areas are presented directly to the side of the hole. The cutters are so disposed that there is little tendency for the reamer to wabble when it is in use; and another desirable feature of such a reamer is that ample clearance is provided around the cutters for the water that is used to flush out the hole, this, of course, being due to the fact that the diameter of the cutters is considerably less than the diameter of the hole. The reamer comprises only a comparatively few parts, all of which can be made rugged and large enough to successfully withstand the strains to which they are subjected when the reamer is used in hard, rocky formations, and as the bearing surfaces on which the cutters are rotatably mounted are exceptionally large and adequately lubricated, said bearing surfaces will not wear down quickly. The reamer can be manufactured at a low cost on account of its extreme simplicity; and another desirable feature of the reamer is that new cutters or bushings can be installed quickly and easily simply by unscrewing the bottom end member 2 from the spindle D and slipping the bushings and cutters endwise off the spindle.

Having thus described my invention, what I claim as new and desire to secure by Letters Patent is:

1. A reamer for the purpose described, consisting of a member that is arranged in longitudinal alinement with the drill to which it is connected, and a horizontally disposed cutter rotatably mounted on said member for acting on the side of the hole, said cutter being eccentrically disposed and rotating about said member as an axis.

2. A reamer for the purpose described, consisting of a member provided with means for enabling it to be connected to a drill stem, a horizontally-disposed cutter on said member arranged eccentric with relation to the axis of rotation of said member for acting on the side of the hole and rotating about said member as an axis, and means for preventing said member from wabbling when said cutter is in operation.

3. A reamer for the purpose described, consisting of a member provided with means for enabling it to be connected to a drill stem, means for enabling a drill bit to be connected to the lower end of said member, and an eccentric horizontally-disposed cutter rotating about said member as an axis for acting on the side wall of the hole.

4. A reamer for the purpose described, consisting of a member that is adapted to be connected to a drill stem or operating device and which is arranged in longitudinal alinement with same, and a plurality of horizontally-disposed cutters surrounding said member and rotatably mounted on said member in different horizontal planes for acting on the side wall of the hole.

5. A reamer for the purpose described, consisting of a member that is adapted to be connected to a drill stem or operating device, and a plurality of horizontally-disposed cutters surrounding said member and arranged in different horizontal planes for acting on the side wall of the hole, said cutters being of considerably less diameter than the diameter of the hole and all of said cutters being rotatably mounted on said member in such a manner that they engage the side wall of the hole at different points and thus prevent the said member from wabbling.

6. A reamer for the purpose described, consisting of a member that is adapted to be arranged in vertical alinement with a drill stem and which is provided with a plurality of horizontal, rotatable cutters that are arranged in different horizontal planes and disposed eccentrically with relation to the axis of rotation of said member about which they rotate.

7. A reamer comprising a spindle that is adapted to be connected to a drill stem or operating device and which is arranged in longitudinal alinement with said stem, and a horizontally arranged cutter rotatably mounted on said spindle and disposed eccentrically with relation to the axis of the spindle.

8. A reamer for the purpose described, consisting of a member that is adapted to be connected to a drill stem or operating device, and a plurality of rotatable cutters arranged horizontally on said member one above the other and disposed eccentrically with relation to the axis of rotation of said member, said cutters being offset or staggered so that they will engage the side wall of the hole at different points and thus prevent said member from wabbling.

9. A reamer for the purpose described, consisting of a vertically-disposed center spindle that is arranged in longitudinal alinement with the device that operates same, and a plurality of horizontally disposed cutters rotatably mounted on said spindle as an axis.

10. A reamer for the purpose described, consisting of a vertically-disposed spindle provided with end-pieces and a plurality of horizontally-disposed cutters rotatably mounted on said spindle between said end-pieces, said cutters being staggered with relation to each other so that they will act on the side of the hole at different points.

11. A reamer for the purpose described, comprising a vertically-disposed spindle or supporting member provided with an eccentric bushing, and a cutter rotatably mounted on said bushing for acting on the side wall of the hole.

12. A reamer for the purpose described, comprising a vertically disposed spindle or supporting member provided with a plurality of eccentric bushings that are offset or staggered with relation to each other, and cutters rotatably mounted on said bushings.

13. A reamer for the purpose described, consisting of a vertically-disposed center spindle or member that is adapted to be connected to a drill stem and which is arranged in longitudinal alinement with same, end-pieces on said spindle, one of which is detachably connected to the spindle, and horizontally-disposed cutters rotatably mounted on said center spindle between said end-pieces.

14. A reamer for the purpose described, consisting of a vertically-disposed spindle provided at its upper end with a threaded portion for enabling it to be connected to a drill stem, horizontally-disposed cutters surrounding said spindle and rotatably mounted on same, one above the other, and means for preventing said cutters from moving longitudinally of the spindle.

15. A reamer for the purpose described, consisting of a vertically-disposed spindle or member that is adapted to be connected to a drill stem, a head-piece at the upper end of said spindle, a bottom end-piece detachably connected to the lower end of the spindle, eccentrically-disposed bearings on the spindle arranged between said end-pieces, and cutters rotatably mounted on said bearings.

16. A reamer for the purpose described, consisting of a vertically-disposed spindle or member that is adapted to be connected to a drill stem, a head-piece at the upper end of said spindle, a bottom end-piece detachably connected to the lower end of the spindle, eccentrically-disposed bearings on the spindle arranged between said end-pieces, cutters rotatably mounted on said bearings, and means on said bottom end-piece to which a drill bit can be connected.

17. A reamer for the purpose described, comprising a member that is adapted to be connected to a drill stem, a plurality of horizontally-disposed cutters that surround said member and rotate about same as an axis, said cutters being eccentrically disposed and arranged in different horizontal planes, and means for supplying a lubricant to the bearings of said cutters.

18. A reamer for the purpose described, consisting of a vertically-disposed spindle provided at its upper end with means for enabling it to be connected to a drill stem, eccentric bushings arranged on said spindle in staggered relation to each other, means for connecting said bushings to said spindle, and cutters rotatably mounted on said bushings.

19. A reamer for the purpose described, consisting of a vertically-disposed spindle provided at its upper end with means for enabling it to be connected to a drill stem, eccentric bushings arranged on said spindle in staggered relation to each other, a key arranged in a longitudinally extending groove in said spindle and projecting into notches in said bushings for connecting the bushings to the spindle, and cutters rotatably mounted on said bushings.

20. A reamer for the purpose described, consisting of a member provided with watercourses that extend longitudinally through same, and a plurality of horizontally-disposed rotatable cutters surrounding said member and arranged in different horizontal planes, said cutters being so mounted that they will act on the side of the hole at different points.

21. A reamer for the purpose described, consisting of a vertically-disposed spindle, eccentric bushings mounted on said spindle and connected to same, cutters rotatably mounted on said bushings, and lubricating ducts formed in said spindle and in said bushings for supplying a lubricant to the bearings of the cutters.

22. A reamer for the purpose described, consisting of a center member that is adapted to be connected to a drill stem or operating device, and a plurality of horizontally-disposed cutters arranged eccentrically on said member one above the other and rotating about said member as an axis, some of said cutters having tapered cutting surfaces.

In testimony whereof I hereunto affix my signature, in the presence of two witnesses, this 16" day of February, 1914.

HOWARD R. HUGHES.

Witnesses:
L. A. GODBOLD,
C. E. REED.